United States Patent
Chan

(10) Patent No.: US 8,132,298 B2
(45) Date of Patent: Mar. 13, 2012

(54) FASTENER FOR CORD

(76) Inventor: Man Chan, Tai Po (HK)

( * ) Notice: Subject to any disclaimer, the term of this patent is extended or adjusted under 35 U.S.C. 154(b) by 466 days.

(21) Appl. No.: 11/961,761

(22) Filed: Dec. 20, 2007

(65) Prior Publication Data

US 2009/0064473 A1    Mar. 12, 2009

(30) Foreign Application Priority Data

Sep. 7, 2007 (CN) .................. 2007 2 0129344 U

(51) Int. Cl.
*F16G 11/00* (2006.01)
(52) U.S. Cl. ..................... 24/115 G; 24/136 R
(58) Field of Classification Search .................. None
See application file for complete search history.

(56) References Cited

U.S. PATENT DOCUMENTS

| 1,616,881 | A | * | 2/1927 | Wharton | 24/115 R |
| 5,737,808 | A | * | 4/1998 | Ikeda | 24/115 G |
| 6,327,751 | B1 | * | 12/2001 | Ikeda | 24/115 G |

* cited by examiner

*Primary Examiner* — Jack W. Lavinder
(74) *Attorney, Agent, or Firm* — Greenberg Traurig, LLP

(57) ABSTRACT

The present utility model relates to a fastener for cord comprising a cord lock mounted on a cord of an article for locking the cord, characterized in that said cord lock has a engaging portion which is provided with a hollow central zone having an inner diameter, said fastener for cord further has a base fixed on said article, a convex portion is arranged on said base for engaging with said central zone in a manner of snap-fastening, the inner diameter of said central zone is slightly smaller than the outer diameter of the convex portion on said base so as to make the central zone engaged, in a manner of snap-fastening, with said base. The present utility model is available for fastening an article (such as a fixer or bottom on a cord) so as to avoid inconveniency brought to users by the article.

7 Claims, 4 Drawing Sheets

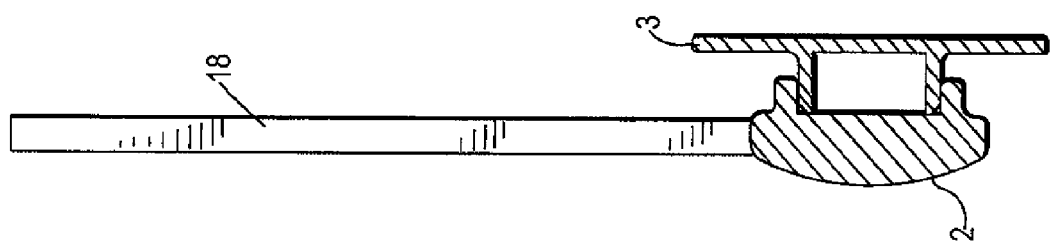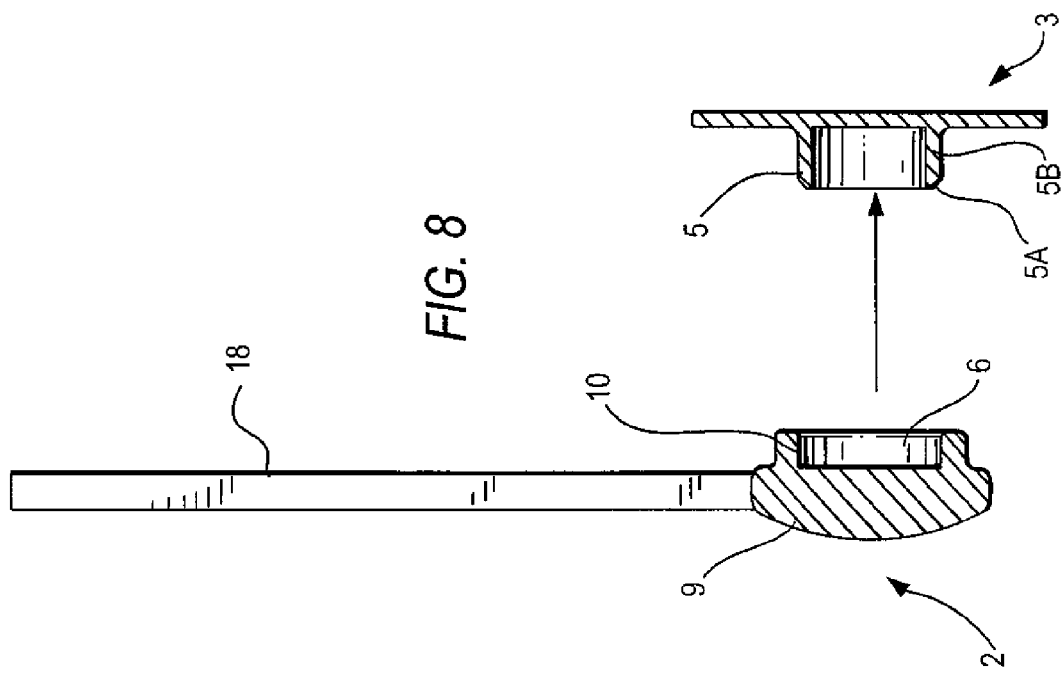

FASTENER FOR CORD

TECHNICAL FIELD

The present utility model relates to a fastener for cord, in particular, it relates to a fastener for fastening the cord of an article (such as the cord on apparel or knapsack).

PRIOR ART

Some cords are attached to such an article as apparel (especially a coat) or knapsack, for example, the hat brim, cuff or the like of a coat is usually tightened or loosed by means of a cord. When tightening the hat or cuff, the hat brim shall be frapped along the cord, and then the cord shall be fastened or hold at a position on the cord which is close to the hat brim so as to prevent the hat brim from being loosen. At present, various fasteners for cord have come in the market. There are also some ornamental cords which are conventionally provided with a fastener at the end portion thereof so as to fasten the end portion. However, this fastener is merely fastened to the cord and is unable to prevent the cord from suspending down from the apparel. Hence, the cord will swing in accompany with the fastener attached thereto, which brings inconveniency to the users during such movement as running.

SUMMARY OF THE UTILITY MODEL

An object of the present utility model is to provide a fastener for cord so as to fasten the cord on such an article as apparel or the like. In this way, the cord will be fastened and will not swing back and forth when the users take such movement as running, thereby removing the inconveniency brought to the users caused by swinging of the cord.

For this purpose, the present utility model provides a fastener for cord comprising a cord lock mounted on a cord of an article for locking the cord, wherein said cord lock has a engaging portion which is provided with a hollow central zone having an inner diameter, said fastener for cord further has a base fixed on said article, a convex portion is arranged on said base for engaging with said central zone in a manner of snap-fastening, the inner diameter of said central zone is slightly smaller than the outer diameter of the convex portion on said base so as to make the central zone engaged, in a manner of snap-fastening, with said convex portion.

The fastener according to the present utility model may further contain the following technical features:

Said base may further has a base body in connection with said convex portion, said base body being flat and fixedly connected to said article.

In addition, said cord lock may be a cord lock for fastening the cord at the end portion of the cord. For example, said cord lock further comprises a base part in connection with said engaging portion, and the end portion of said cord is fixedly connected on said base part.

Said cord lock may be a cord lock lockable at any position of the cord,

The cord lock and the base may be made of an elastic material, such as plastics.

The fastener of the present utility model can be used as below: when an article (such as apparel or knapsack) incorporates an ornamental cord or a cord for tightening the cuff, hat brim or the like, the engaging portion of the cord lock mounted or fixed on the cord engages in a manner of snap-fastening with the convex portion arranged on the base on said article, such that the cord lock can be fixed on the base and thereby fixed on said article. In this way, the cord lock will bring no trouble to users.

The base can be sewed on apparel such as the hat of a coat without affecting the appearance of apparel.

BRIEF DESCRIPTION OF THE DRAWINGS

Hereinafter the present utility model will be described in detail in combination with the drawings showing the embodiments of the faster.

FIG. 8 is a schematic view of the cord lock of the fastener according to the second example shown in FIG. 3;

FIG. 9 is a schematic view, similar to FIG. 4, showing the use state of the fastener.

PREFERRED EMBODIMENTS

Figure 1:
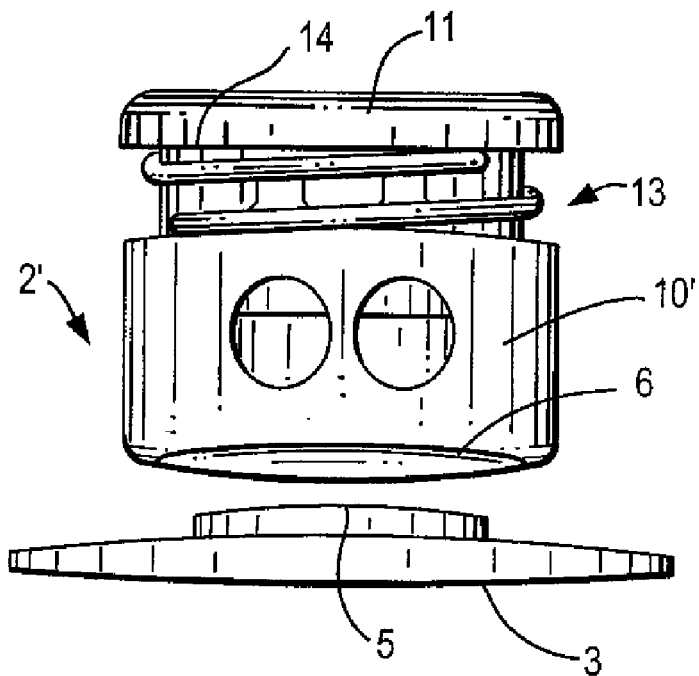
FIG. 1 is a schematic view of a fastener for cord according to the first example of the present utility model.

Referring to FIGS. 1-9 showing a preferred example of a fastener for cord according to the present utility model, said fastener comprises a cord lock 2, 2' mounted on a cord 18 of an article for locking the cord, wherein said cord lock 2, 2' has a engaging portion 10, 10' which is provided with a hollow central zone 6 having an inner diameter, said fastener for cord further comprises a base 3 fixed on said article, a convex portion 5 is arranged on said base for engaging in a manner of snap-fastening or buckle-fastening with said central zone 6, the inner diameter of said central zone 6 is slightly smaller than the outer diameter of the convex portion 5 on said base 3 so as to make the central zone 6 engaging in a manner of snap-fastening or buckle-fastening with said base 3. The structure for snap-fastening or buckle-fastening is known in the prior art, for example, snap-fasteners on apparel or the like are engaged in the above-mentioned manner. In the present utility model, the central zone 6 can engage with said base 3 in a manner of snap-fastening or buckle-fastening by adopting such an engaging structure similar to snap-fasteners. For the sake of briefness, such an engaging structure in a manner of snap-fastening or buckle-fastening will not be described in detail in the present description. A person skilled in the art is capable of engage the cord lock with the base in a manner of snap-fastening or buckle-fastening by means of such engaging structure be means of snap-fastening or buckle-fastening as described in the present utility model.

For example, the base 3 comprises two parts, which are a convex portion 5 and a base body 8. Comparing said convex portion 5 with the central zone 6 of the product 2 or 2', the outer diameter of said convex portion 5 is slightly larger than the inner diameter of said central zone 6. Hence, a pushing effect would be made after said central zone 6 of the cord lock is engaged with said base 3, so that the outer wall of the convex portion 5 is pushed against the inner wall of the central zone 6 in order that the base 3 will not be dropped out of the cord lock. In fact, the outer wall of the convex portion 5 and the inner wall of the central zone 6 are engaged by an interference fit, which is well known in the prior art. On the other hand, an inability of engagement might be caused since the outer diameter of said convex portion 5 is larger than the inner diameter of said central zone 6. Hence, according to an embodiment, as shown in FIG. 8, the convex portion 5 may be divided into two portions, i.e., the upper portion 5A and the lower portion 5B, in which the lower portion 5B is perpendicular. The outer wall of the lower portion 5B is gradually tapered so as to form the outer wall of the upper portion 5A, which is of an arc edge. The outer diameter of the upper portion 5A would be smaller than the inner diameter of the central zone of the cord lock, which could make said convex portion 5 smoothly slide into the hollow center zone 6 of the cord lock for the engagement therebetween.

Said base 3 may further have a base body 8 in connection with said convex portion 5, said base body 8 is flat and fixedly connected to said article. For example, the base body 8 can be sewed on such article as apparel etc.

Figure 3:
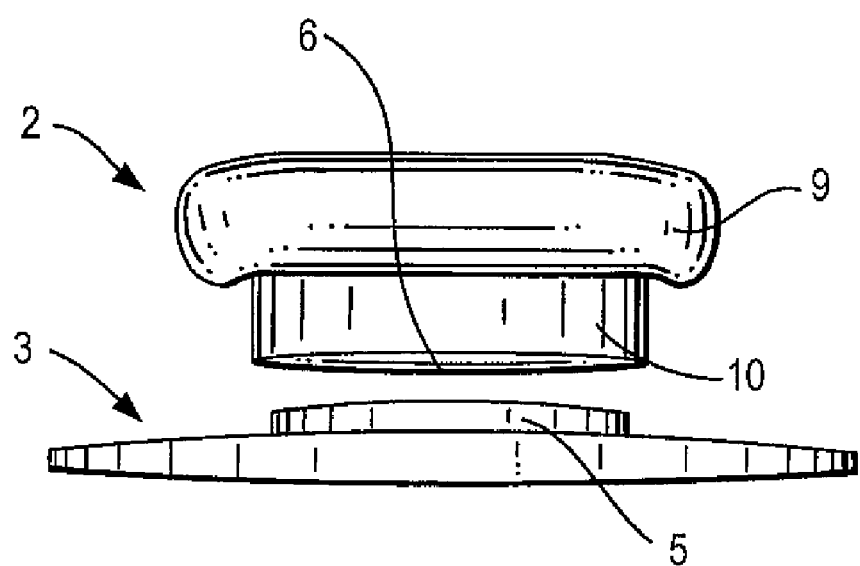
FIG. 3 is a schematic view of a fastener for cord according to the second example of the present utility model.
Figure 4:
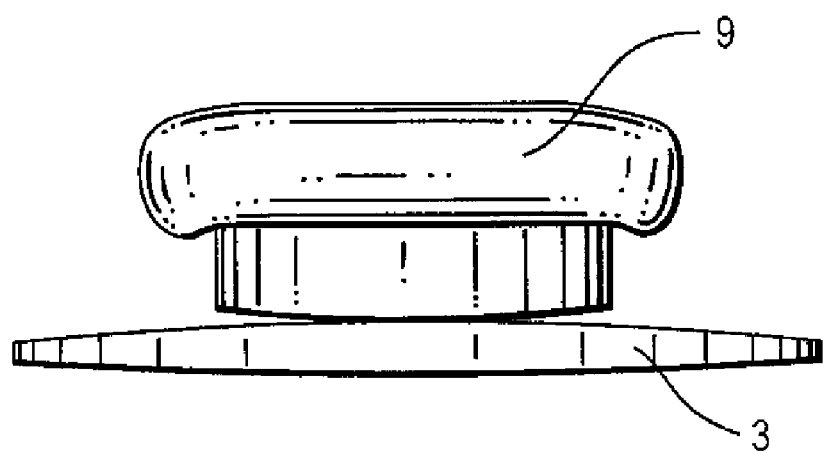
FIG. 4 is a schematic view of the use state of the fastener shown in FIG. 3, wherein the engaging portion of the cord lock engages in a manner of snap-fastening with the base.

Said cord lock can be a cord lock fixed at the end portion of the cord, as seen from FIGS. 3, 4 and 8, wherein said cord lock further comprises a base part 9 in connection with said engaging portion 10, the end portion of said cord is fixedly connected on said base part 9. Of course, cord locks of other known structures, which are fixed on the end portion of the cord, are available in the present utility model as well.

Figure 2:
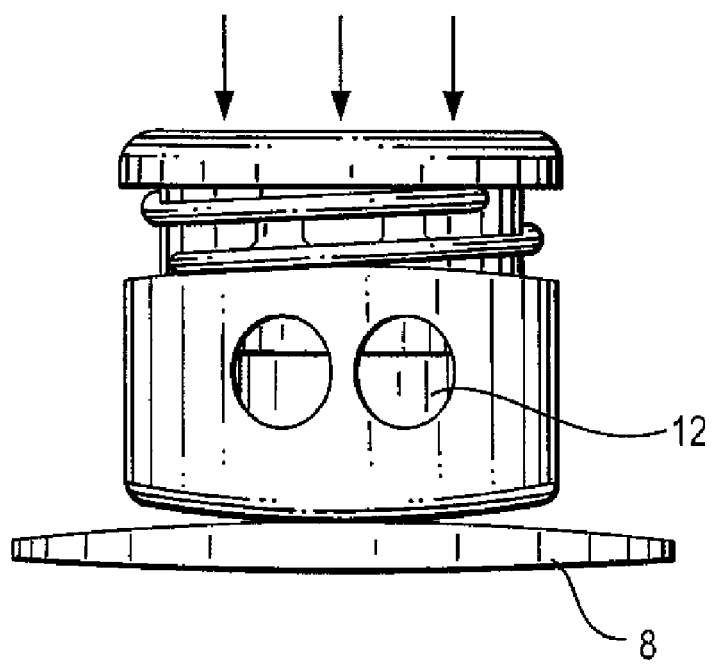
FIG. 2 is a schematic view showing the use state of the fastener shown in FIG. 1, wherein the engaging portion of the cord lock engages in a manner of snap-fastening with the base.
Figure 5:
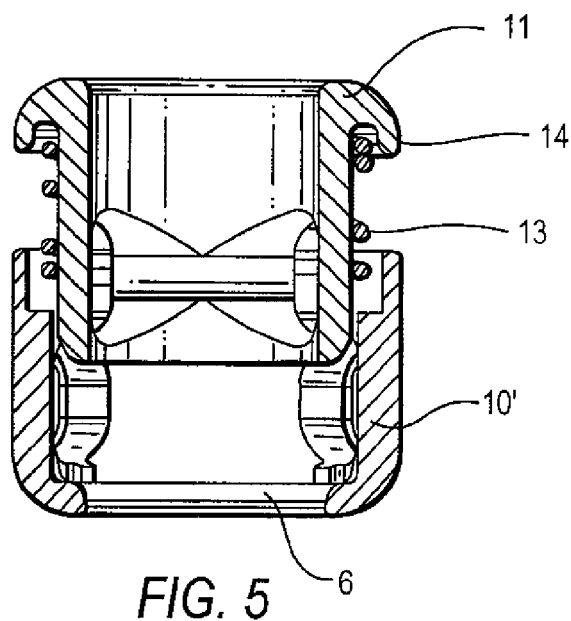
FIG. 5 is a schematic view of the cord lock of the fastener according to the first example shown in FIG. 1.
Figure 6:
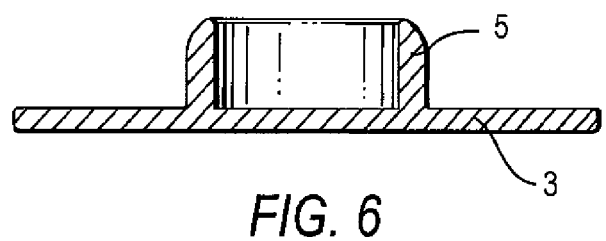
FIG. 6 is a schematic view of the base body.
Figure 7:
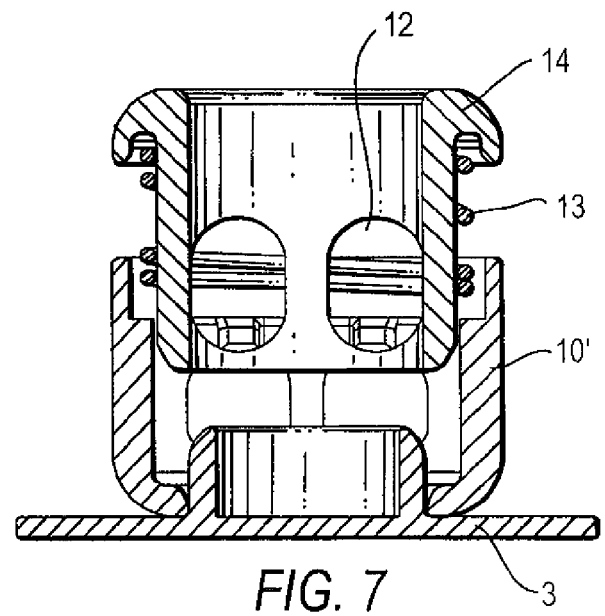
FIG. 7 is a schematic view, similar to FIG. 2, showing the use state of the fastener.

Said cord lock can be a cord lock for locking the cord at any position of the cord, as seen from FIGS. 1, 2 and 5, wherein said cord lock further comprises a pressing member 11 with a lower end located inside of said engaging portion 10' and an upper end having a flange 14. Between the pressing member 11 and said engaging portion 10' there is a spring 13, one end of the spring 13 abutting against the flange 14 of said pressing member 14 and the other end of the spring 13 abutting against a boss provided on the inner wall of said engaging portion 10'. The side wall of the engaging portion 10' is provided with a throughhole 12 through which the cord passes. The cord passing through the throughhole 12 is locked by the spring force of the spring 13. Of course, in the prior art, there are various cord locks capable of locking the cord which can be incorporated by the fastener in the present utility model.

The cord lock and the base 3 can be made of elastic material (such as plastics). Engaging the cord lock with the base in a manner of snap-fastening or buckle-fastening can be realized by elastic deformation of the elastic material. This, however, is also known in the prior art.

Specifically, as shown in FIGS. 1, 2 and 5, the cord lock 2' may be used for holding or fixing the cord (such as a cord of a coat). Said cord lock 2', which is hollow in the central zone thereof, may also act as a button for engaging with the base 3 sewed on apparel so as to hold the cord firmly. In order to engage the cord lock with the base, the top portion of the cord lock can be pressed so as to engage them by force. This would be easily fulfilled as the cord lock and the base can be pressed together by finger(s). Just push the side portion of the cord lock by fingers for the separation thereof.

Similar to the cord lock 2', the cord lock 2 is hollow in the central zone thereof. The cord lock 2 can be engaged with the convex portion of the base 3 when pressing the top portion of the cord lock 2 by fingers. And just pull lightly the cord on the cord lock 2 for the separation thereof If the cord is disposed inside the hat of a coat, the present utility model can fasten the cord by the end portion of the cord or the cord lock during use of the hat. As the cord is fastened by the present utility model, the users may have less inconveniency during such outdoor sports as running.

The present utility model is available for fastening an article (such as a fixer or button on a cord) so as to avoid inconveniency brought to user by the article. The base can be sewed on apparel such as the hat of a coat without affecting its appearance.

What is claimed is:

1. A fastener for cord, comprising:
   a cord lock mounted on a cord for locking the cord, wherein the cord lock has a engaging portion which is provided with a first hollow central zone having a first inner diameter;
   wherein the fastener for cord further has a base fixed on a clothing article,
   wherein the base having a convex portion;
   wherein the cord lock further comprises:
      a pressing member having
      a second hollow central zone having a second inner diameter;
      a lower end, which is located inside the engaging portion,
      an upper end having a flange extended from an outside wall of the pressing member,
      a boss provided on an inner wall of the engaging portion,
      a spring, wherein the spring is positioned outside of the pressing member, encircling at least a portion of the pressing member;
   wherein a first end of the spring is abutting against the flange of the pressing member and a second end of the spring is abutting against the boss of the engaging portion;
   wherein the convex portion is arranged on the base for engaging with the first hollow central zone in a manner of snap-fastening to allow the fastener to be removably fixed to the clothing article;
   wherein the first inner diameter of the first hollow central zone is slightly smaller than the outer diameter of the convex portion on the base hereby resulting in the first hollow central zone engaging with the convex portion in a snap-fastening manner;
   wherein the cord lock is sufficiently designed to form, when the pressing member is pressed into the engaging portion, a cavity positioned outside of the pressing member, wherein the cavity has:
      a top side to be bounded by at least a portion of the flange,
      a lower side to be bounded by at least a portion of the boss,
      a first wall to be bounded by at least a portion of the outside wall of the pressing member, and
      a second wall to be bounded by at least a portion of the inner wall of the engaging portion; and
   wherein the first and second hollow central zones form a throughhole through which the cord can pass to allow the cord passing through the throughhole to be locked by the spring force of the spring.

2. The fastener according to claim 1, wherein the base further has a base body in connection with the convex portion, and wherein the base body being flat and fixedly connected to the clothing article.

3. The fastener according to claim 1 or 2, wherein the cord lock is a cord lock for fastening the cord at the end portion of the cord.

4. The fastener according to claim 3, wherein the cord lock further comprises a base part in connection with the engaging portion, and the end portion of the cord is fixedly connected on the base part.

5. The fastener according to claim 1 or 2, wherein the cord lock is a cord lock lockable at any position of the cord.

6. The fastener according to claim 1 or 2, wherein the cord lock and the base are made of an elastic material.

7. The fastener according to claim 6, wherein the cord lock and the base are made of plastics.

* * * * *